United States Patent [19]

Guerillot et al.

[11] Patent Number: 5,764,515

[45] Date of Patent: Jun. 9, 1998

[54] METHOD FOR PREDICTING, BY MEANS OF AN INVERSION TECHNIQUE, THE EVOLUTION OF THE PRODUCTION OF AN UNDERGROUND RESERVOIR

[75] Inventors: Dominique Guerillot, Paris; Frédéric Roggero, Pau, both of France

[73] Assignee: Institute Francais du Petrole, Rueil-Malmaison, France

[21] Appl. No.: 645,070

[22] Filed: May 13, 1996

[30] Foreign Application Priority Data

May 12, 1995 [FR] France .................... 95 06085

[51] Int. Cl.$^6$ .................................... G06F 19/00
[52] U.S. Cl. .................................... 364/420
[58] Field of Search .................... 364/420, 421, 364/422, 578; 434/299, 150, 151, 152, 153; 367/73

[56] References Cited

U.S. PATENT DOCUMENTS

| | | |
|---|---|---|
| 4,969,130 | 11/1990 | Wason et al. |
| 5,128,866 | 7/1992 | Weakley .................... 364/421 |
| 5,444,619 | 8/1995 | Hoskins et al. .................... 364/421 |
| 5,461,562 | 10/1995 | Tabanou et al. .................... 364/421 |
| 5,583,825 | 12/1996 | Carrazzone et al. .................... 364/421 |

OTHER PUBLICATIONS

Theodore R. Madden et al., "Three-Dimensional Magnetotelluric Modeling and Inversion", Proceedings of the IEEE, vol. 77, iss. 2, pp. 318–333, Feb. 1989.

The Leading Edge, vol. 9, No. 12, Dec. 1990, pp. 89–97, R.C. Nolen–Hoeksema "The future role of geophysics in reservoir engineering".

The Leading Edge, vol. 8, No. 9, Sep. 1989, pp. 22–28, D.H. Johnston "Recent advances in exploitation geophysics".

Geophysics, vol. 57, No. 2, Feb. 1992, pp. 233–244, G.J.M. Lortzer, et al "An integrated approach to litholgic inversion—Part 1 Theory".

The Leading Edge, vol. 8, No. 2, Feb. 1989, pp. 42–44, J.G. Richardson "Appraisal and development of reservoirs".

The Leading Edge, vol. 8, No. 4, Apr. 1989, pp. 14–20, M. De Buyl "Optimum field development with seismic reflection data".

*Primary Examiner*—Donald E. McElheny, Jr.
*Attorney, Agent, or Firm*—Antonelli, Terry, Stout & Kraus, LLP

[57] ABSTRACT

A model for simulating the behaviour of an underground reservoir is defined from initial geologic knowledge and available data. It allows production forecasts to be achieved from parameters representative of the initial data. The method notably consists in defining one or several possible production evolution scenarios by creating, for each of these scenarios, new production data corresponding to hypotheses on the future states of the reservoir. For each scenario considered, it is checked whether it is possible to adjust the available parameters of the simulation model, considering the constraints of the initial geologic model, so that the simulation model reproduces both the production data measured and the data added. The method can be used to quantify uncertainties on the production forecasts by seeking the min/max extremes of the future production values. Application: production of hydrocarbons for example.

4 Claims, 7 Drawing Sheets

METHOD FOR PREDICTING, BY MEANS OF AN INVERSION TECHNIQUE, THE EVOLUTION OF THE PRODUCTION OF AN UNDERGROUND RESERVOIR

FIELD OF THE INVENTION

The present invention relates to a method for predicting, by means of a scenario inversion technique, the evolution of the production of an underground reservoir and notably of a reservoir containing hydrocarbons.

BACKGROUND OF THE INVENTION

Inversion techniques are extensively used in the field of reservoir engineering. The following usual fields of application can be cited by way of example:

At the laboratory stage, they are used to determine various parameters representative of the behaviour of rocks in relation to fluids. These parameters can be, for example: the absolute and relative permeability, capillarity curves, etc.

Inversion techniques are also commonly used to interpret well tests. The inversion parameters are then, for example, the permeability of one or several facies, the geometrical limits of a geologic structure, the coefficients borne by the productivity index of a well, etc.

To survey a reservoir, inversion is used to match the response of a numerical simulator with available production measurements (or "production history"). The parameters can be, for example, the porosity of the rocks, the absolute and relative permeabilities thereof, the productivity indices of the wells, etc.

Technique of Matching the Production History of a Reservoir

Inversion techniques are a very active research field in reservoir simulation. This process of matching a production history by adjusting the parameters of a simulation model is also referred to by specialists as "History Matching". It notably consists in finding a set of parameters governing the fluid flow equations which, integrated in a numerical simulator, allow the data observed or indicated to be found again.

The data observed in each well are, by way of example, mainly the pressure, the composition of the fluids or the flow rate of the various phases. Any combination of these variables can also be used, notably the water cut, the G.O.R. (Gas-Oil Ratio), etc. There can generally be many solutions to the inverse problem, allowing the production history of a reservoir to be reconstructed by means of an adjustment process. It is therefore important to integrate the available geologic data so as to limit the range of the possible solutions. Taking these initial geologic data into account allows more realistic and reliable production forecasts to be obtained from a simulation.

To construct the initial model, all the available information is incorporated therein: raw or interpreted data, geological surveys, seismic measurements, etc. The physical knowledge of a reservoir can be integrated by considering for example:

the structure of the sedimentologic units;
the variation limits of the petrophysical values (porosity, permeabilities, etc) associated with the lithofacies, and the statistical information relative to the mean values, the standard deviations, the spatial correlation, etc.

The process known as history matching conventionally comprises the stages as follows:

a) A simulation model is constructed on the basis of the initial geologic knowledge and by integrating as many available data as possible.

b) Significant parameters of the model are selected for the inversion process by considering: the knowledge of the reservoir behaviour as a function of these parameters, their qualitative influence on production, the initial uncertainties associated with these parameters, etc.

c) Adjustment with the model parameters is achieved in order to reproduce the production history or the data observed. A set of parameter values being given, direct simulation allows the expected results to be compared with the observations. The most commonly used method is a trial-and-error procedure is where the reservoir engineer's experience comes into play: the values of the parameters are adjusted as a function of the knowledge of the reservoir and of the understanding of the dynamic behaviour thereof.

It is sometimes possible to accelerate this adjustment stage by means of an automatic procedure allowing an iterative modification of the value of the parameters in order to obtain a better matching between the result of the calculation and the observation data.

The drawback of this conventional method, largely empirical, is that the influence of the initial knowledge of the reservoir is not directly quantified in the inversion process. In fact, it is possible to match a production history while deviating from the allowable physical quantities. Moreover, uncertainties on the production forecasts are not directly quantified during the inversion process. Sensitivity studies are sometimes achieved on the values of the parameters obtained by adjustment, in order to apprehend the influence thereof on the forecasts, but these studies are not an integral part of the inversion process.

The history matching process can be formalized as follows:

Physical phenomena are modelled by means of a mathematical model denoted g, corresponding here to the simulator of fluid flows in the reservoir. This model depends on $n_p$ parameters (vector x) and on the time t. The physical phenomena modelled can then be written in the form d=g (x,t). If $d_m$ represents a set of $n_m$ observations corresponding to the measurements of d at different times $t_i$, the following condition can then be written for the model to reproduce the observations:

$$d_m = \{g(x,t_i), i=1, n_m\}$$

In order to define a criterion of adaptation of the model to the observations, a functional can be defined for example in the conventional form of the "least squares" type, with the expression as follows:

$$F_m(x) = \frac{1}{2} \Sigma_{i=1,n_m} \{(d_i - g(x,t_i))^2\}$$

The parameters to be retained are those which minimize the functional $F_m(x)$ by taking account of the constraints imposed on the parameters.

It can be noted that the quality of the forecasts allowed by this procedure can sometimes be questionable for two main reasons. First, the initial or a priori knowledge of the reservoir is not quantified, so that it may disappear during the minimization operation. The second reason is that there may be several solutions that minimize the functional. In order to increase the quality of the forecasts, it is therefore important to take account of the available information on the geologic model, and of possible statistics characterizing these parameters during the adjustment operation.

Technique of Bayesian Type Inversion of a Simulation Model

To take this initial information into account, it is possible to use an inversion formalism known to specialists under the name of "Bayesian inversion", and described for example by:

Floris F. J. T. et al. in "Flow Constrained Reservoir Characterization using Bayesian Inversion", 4th ECMOR, Norway, 7–10 Jun. 1994.

This formalism, known to specialists, allows to take account of a priori information on parameters in the form of probabilistic models, errors made in the measurements with the associated probabilists thereof, and also errors due to the use of a numerical simulator for modelling flows. With the calculation means that are commonly used, the Bayesian formalism is unfortunately very costly in calculating time and it is not very practical when an entire field is considered, because it imposes that the flow simulator "sweeps" all of the possible parameters to evaluate the probability of each solution.

The basic principle of this Bayesian inversion applied to the simulation of flows in a reservoir is to change the initial geologic model by using production data in order to improve the quality of this initial model. The main stages thereof are:

a) The construction of an initial geologic model.

It is an "a priori" model of probabilistic type. The reservoir is described in the form of a set of parameters with the associated probability density functions p(x) thereof Mean values for these a priori parameters (denoted $x_a$) and standard deviations (denoted σx) can be used to model this probability density function denoted pdf With Gaussian type uncertainties, modelled by a covariance operator denoted Cx, the a priori pdf function has the following expression:

$$p(x) = Cte \, exp\{-(x_a-x)^T C_x^{-1} (X_a-X)\}$$

To express this a priori information in an objective function, a new term denoted $F_x(x)$, that is to be added to the previously defined term $F_m(x)$, can be expressed in the case of Gaussian uncertainties as follows:

$$F_x(x): \frac{1}{2} \{-(X_a-X)^T C_x^{-1}(X_a-X)\}$$

b) the use ofthe data observed:

Observation data are used to calculate the a posteriori probability density function p(x/d=dm) in accordance with the Bayesian rule:

$$p(x/d=d_m) = (p(d=d_m/x) \cdot p(x))/ p(d=d_m),$$

where $p(d=d_m x)$ is the likelihood function that quantifies the differences between the observed values $d_m$ and the calculated values d for a given set of parameters x. When the uncertainties on the measurements and on the model are Gaussian, and modelled by a covariance operator $C_m$, this likelihood function has the expression as follows:

$$p(d=d_m/x) = Cte \, exp\{-(d_m-d)^T C_m^{-1} (d_m-d)\}$$

To obtain a statistical interpretation in terms of probability density functions pdf, the a posteriori function has to be determined in practice for the entire range of parameters. If the maximum a posteriori probability is considered only, the parameters corresponding to this optimum are those which minimize the objective function $F=F_{m(x)}+F_x(x)$.

To sum up, for each set of parameters, the associated probability p(x) is increased when the response of the model g(x,t) provides values close to those $d_m$ observed, i.e. when the likelihood function $p(d=d_m/x)$ is great.

The conventional history matching method and the Bayesian inversion technique mentioned and discussed above are used to adapt a simulation model to measurable real data. The major drawbacks of the first method are the possibility of losing part of the initial information and a great uncertainty on the reliability of the forecasts. The Bayesian formalism allows to characterize the uncertainties on the geologic parameters better and takes account of the a priori geologic information. However, the Bayesian type inversion is in practice very difficult to apply to real case studies since the cost due to the number of simulations necessary is prohibitive.

Furthermore, the object of these methods is not to answer directly the question of the quantification of uncertainties related to production forecasts. Uncertainties are conventionally evaluated a posteriori, after the inversion stage. Uncertainty forecasts are nevertheless crucial in order to establish a reservoir development program requiring economic criteria based on the reliability of the forecasts.

SUMMARY OF THE INVENTION

The method according to the invention allows the quantification of production uncertainties to be integrated directly in the inversion process in a single procedure. The object of the method is therefore to allow:

an optimum matching of a simulation model with a production history, by taking account of all the a priori information, and direct quantification of the uncertainties on the production forecasts and hypothesis tests on the evolution ofthese production forecasts.

The method enables a reservoir engineer to test production forecast "scenarios" and thus to better validate the model in relation to the initial reservoir knowledge. It is therefore possible to check if a production scenario is compatible with geologic data, or to quantify the production uncertainties resulting from geologic uncertainties.

Forecasts relative to the evolution of the production of an underground zone containing fluids, such as a hydrocarbon reservoir, can be obtained through the method according to the invention by carrying out the following stages:

a) In a first conventional stage, already described for the common inversion methods, an initial geologic model defined by a set of parameters is constructed by integrating all the data available. At this stage, usual inversion methods allow to determine the parameter values that enable the model response to be adjusted to the production history;

b) one or several possible production evolution scenarios are defined. For each of these scenarios, fictitious values are added to the observed values (or "real" values) at given future times corresponding to these hypotheses;

c) for each scenario, the parameters of said model are adjusted so as to reproduce both the real measurements from the production history and the data added at future times, and an inversion procedure is applied so as to obtain, for each scenario, a new set of parameters x characterizing a modified geologic model and corresponding to the hypotheses of the scenario;

d) for each of these modified geologic models, direct simulations are performed in order to establish new production forecasts.

It is possible to use conventional procedures in the inversion stage. It is however advantageous to use an automatic inversion procedure where an objective function is minimized by including therein the initial information associated with the geologic model, and to resort to the Bayesian formalism to take account of these initial data.

To that effect, the method can include a combination of an inversion formalism of a conventional Bayesian type and of an optimization algorithm based on the use of the gradients method allowing to obtain the derivatives of the production forecasts with respect to the parameters. Combination of this method with a Bayesian type formalism allows to reduce in considerable proportions the number of operations necessary to obtain the optimum probability by combining the advantages of the Bayesian inversion (taking account of the initial information) with the effectiveness of the inversion algorithms using gradients.

The method according to the invention thus notably allows:

to translate the uncertainty inherent in the geologic model in the form of a quantification of the uncertainty relative to the production, to test whether forecast hypotheses are compatible with the initial reservoir knowledge.

Finally, the combination of a Bayesian type formalism with a gradients method allows this method to be translated in the form of algorithms that are more effective than those previously used.

BRIEF DESCRIPTION OF THE DRAWINGS

Other features and advantages of the method according to the invention will be clear from reading the description hereafter of embodiments and validation tests given by way of non limitative examples, with reference to the accompanying drawings in which.

DESCRIPTION OF THE METHOD

The method for adjusting production scenarios according to the invention comprises the following stages:

1) An initial geologic model of the reservoir zone studied is first constructed by including the information available a priori. An inversion method of a well- known type and notably the Bayesian inversion method described above can be used to achieve a first production history matching. The adjusted model can be used to obtain a mean forecast.

2) This initial model being established, one or several possible production evolution scenarios are defined. These scenarios correspond to hypotheses about the evolution of the production in time. For each of these scenarios, fictitious data corresponding to these hypotheses are added at given future times. These fictitious data can relate for example to a possible water inflow at a given period or to hypotheses relative to oil recovery.

3) The parameters of the initial model are adjusted in order to match both the production history (observed data) and the additional data corresponding to the production hypotheses. For each scenario, a conventional inversion procedure is used so as to obtain a new geologic model, defined by a new set of parameters x and corresponding to the prior hypotheses.

4) The probability of each scenario created is directly checked by using a Bayesian type inversion formalism for example, with the value of the a posteriori probability density function.

5) For each of these scenarios, direct simulations from the models obtained allow new production forecasts to be established.

Several cases can occur. By considering the selection of the parameters and the constraints on the geologic model, a set of parameter values allowing to reproduce the data measured and added can be found. This information can be very useful for the reservoir engineer. For example, if the object of the scenario created is to check if a premature water inflow can occur in a determined well, and if the scenario evaluation procedure leads to a set of physically allowable parameter values, the reservoir engineer can make decisions relative to the development of the reservoir in order to prevent this risk, or decide to perform new measurements to check if the risk is real.

Another conceivable case is that where the scenario adjustment procedure is possible only at the expense of a considerable distortion of the initial geologic model. The reservoir engineer's forecasts can then be confirmed and he can be confident that such an event is unlikely to occur. On the same hypothesis of the prevention of a premature water inflow, he can consider that the risk is low before a given lapse of time.

Another application of the method is the direct quantification of the production uncertainties through the search for extreme scenarios. This application is described hereunder.

Comparison of a Pessimistic Scenario and of an Optimistic Scenario Corresponding to an Uncertainty Estimation The previous objective function F as introduced in the description of the conventional inversion techniques uses the information obtained from the bringing in of the reservoir to the present time. Several sets of parameter values can represent solutions that minimize the objective function. Management of the uncertainties in the forecasting process from the present time (t=tt) of the production period to a future time (t=tf) can amount to selecting, from several possible solutions, the set of parameter values giving the "best" scenario and that giving the "worst". The scenarios can be defined by using a criterion depending on the production strategy in the forecast period considered, for example between tt and tf The criterion can be, for example, the total amount of oil produced, the maximum total flow rate, the time of the water inflow, the GOR, etc.

The best way to solve this problem is to apply the method according to the invention to two optimization problems corresponding respectively to the "best" scenario for the first one and to the "worst" scenario for the second.

In the first case, one finds the set of parameters giving both a good matching of the reservoir production history (i.e. the set of parameters that minimizes Fm+Fx) and a maximum value for the criterion:

$$\text{Min}(Fm+Fx)+\text{Max}(\text{Criterion}).$$

In the second case, one finds the set of parameters that combines a good history matching with a minimum value of the criterion:

$$\text{Min}(Fm+Fx)+\text{Min}(\text{Criterion}).$$

Formalism of the Method

A future time tf is selected and new data are added to the existing production data. Each of these new values corresponds to a production forecast scenario. The min/max production forecast scenarios are determined for this future time tf To that effect, the values of the parameters are adjusted so as to obtain an optimum matching of the production history while distorting the production forecast curve, so that the minimum or the maximum is reached at the future time t=tf. An isoprobability constraint is imposed in order to control the possibility of each scenario.

The problem amounts to an optimization problem with non linear constraints. The objective function used is $$F=F_m+F_x+F_f$$

$F_m+F_x$ represents the previous objective function including the a priori data. $F_f$ has the expression as follows:

$$Ff=\tfrac{1}{2}(d_f-g(x,t_f))^2$$

where $d_f$ represents the additional data at the time $t_f$ and $g(x,t_f)$ the production forecasts at the time $t_f$.

$F_f$ is an additional constraint used to obtain the min/max scenarios. The added data $d_f$ are adjusted to meet the two conditions as follows:

1) $F_m+F_x<F_{hmc}$, where $F_{hmc}$ is a given criterion measuring the quality or the allowable standard of the production history matching;

2) $g(x,t_f)$ represents a maximum or minimum forecast.

The first constraint is equivalent to a relative probability constraint on an a posteriori probability density function, with reference to the maximum probability. An a posteriori probability ratio (ppr) being given:

$$ppr=p(x/d=d_m)/p(x\infty=d_m),$$

where $x_4$ is the position of the optimum (values of the parameters corresponding to the maximum probability). The allowable standard criterion for history matching is then:

$$F_{hmc}=F_m(x\infty)+F_x(x\infty)-\log(ppr).$$

In order to minimize the objective function $(F=F_m+F_{x+Ff})$, a quadratic convergence optimization algorithm can be used, such as the Gauss-Newton algorithm that is well-known to specialists.

This algorithm can be used to conduct an automatic history matching procedure by seeking simultaneously the maximum or the minimum production forecasts.

A multi-purpose reservoir simulator can be advantageously used to conduct this procedure by applying the gradients method. In fact the sensitivity of the model to the inversion parameters is directly obtained from the gradients method. This method is well-known to specialists and described for example by:

Anterion F. et al, "Use of parameter gradients for reservoir history matching", SPE 18433, Houston, Tex., Feb. 6–8, 1989.

By using the gradient values, the optimization algorithm is very effective for treating the problem in a global iterative method including the search for extreme scenarios and the optimum matching of production history. The method according to the invention allows to use an inversion algorithm combining the advantages of the Bayesian formalism and the effectiveness of optimization algorithms based on the use of gradients. The method allowing to combine the Bayesian formalism and the gradients method is described hereafter.

Modified Bayesian Type Inversion Formalism

To conduct the inversion procedures, one can advantageously use a particular inversion method derived from the Bayesian type formalism, which allows a direct and much faster search than the conventional formalism of the position of the optimum of the a posteriori probability density function.

This objective is reached by defining a functional to be optimized and by combining the Bayesian type formalism with the gradients method. The initial information associated with the geologic model can here be included in this functional to be minimized. Furthermore, with some assumptions, it is possible to obtain an approximation to the a posteriori probability density function about this optimal solution. In order to include this initial knowledge in the functional to be minized (denoted F), a new term Fx depending on the difference between a mean value $x_a$ given a priori and the value x of the parameters is introduced:

$$F=(F_m+F_x)2,$$

with $$F_m=(d_m-d)^T C_m^{-1}(d_m-d),$$

and $$F_x=(x_a-x)^T C_x^{-1}(x_a-x).$$

Covariance operators are introduced for modelling the Gaussian uncertainties on the measurements (matrix $C_m$) and the a priori probability density function on the parameters (matrix $C_x$).

The formulation proposed constitues an extension of the conventional objective function of least squares. There is a direct link between the objective function and the Bayesian rule. The a posteriori probability density function can be expressed in the form:

$$p(x/d=d_m)=Cte\cdot exp(-F)=Cte\{exp(-F_m)\cdot exp(-F_x)\},$$

with $$p(d=d_m/X)=Cte1\{exp(=F_m)\}$$

$$p(x)=Cte2\{exp(-F_x)\}.$$

It can thus be considered that the parameters obtained for the maximum of the a posteriori probability density function, denoted $x_\infty$, are those which minimize the objective function F. This correspondence is well-known to inversion specialists. The modified procedure is distinguished by:

- the use of the gradients method for minimizing the objective function which, according to the invention, allows to obtain extreme production scenarios with an isoprobability criterion, and
- the use of the gradients method combined with the Bayesian type formalism in order to obtain, by linearization, an approximation to the a posteriori probability density function about the optimum. In fact, this process allows to meet effectively the a posteriori isoprobability constraints in inversion algorithms.

When convergence is reached in the optimization procedure and the optimal values $x_\infty$ have been found by using the gradients method, assuming that the a posteriori probability density function is locally Gaussian, it is modelled by an a posteriori covariance operator. Calculation of this covariance operator gives an approximation to the "a posteriori probability density" function.

Experimental Ccase

The validity of the method according to the invention has been tested on a synthetic experimental case proposed hereafter, which clearly shows the improvement provided by combining the Bayesian type inversion formalism with a gradient method, and the possibility of quantifying uncertainties on forecasts by seeking extreme scenarios.

After defining a synthetic geologic representation, a numerical simulation has been performed in order to obtain synthetic production data by using a standard industrial reservoir simulator.

Figure 1:
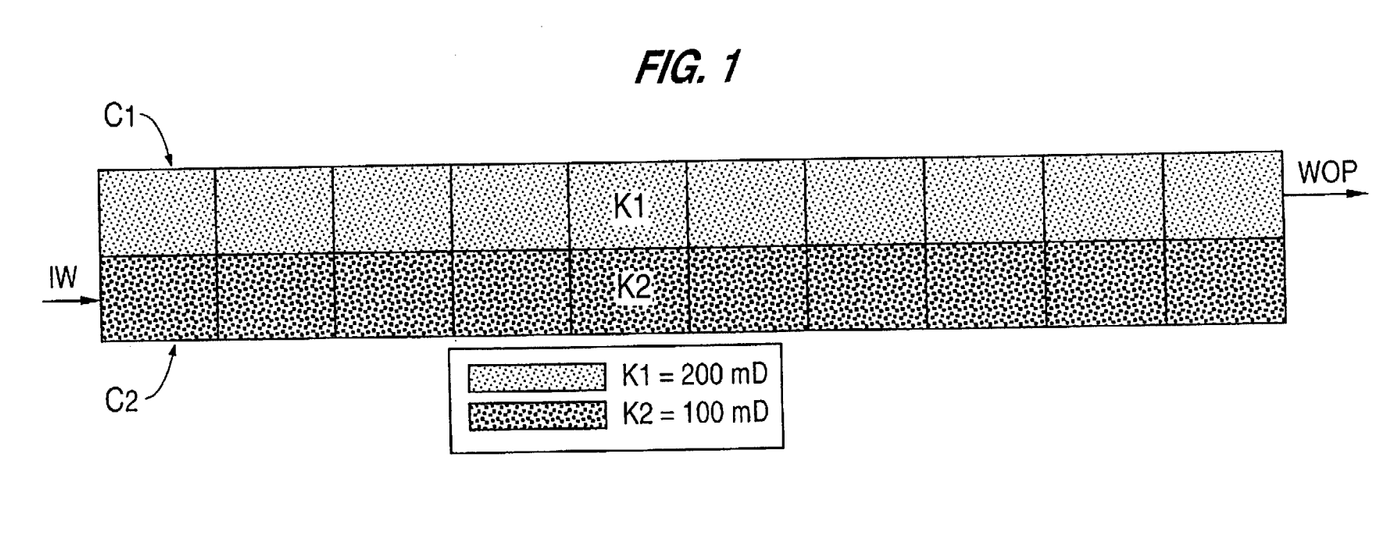
FIG. 1 diagrammatically shows a geologic model made up of two layers C1, C2 in vertical section.

An initial geologic representation is selected, that constitutes the information available a priori on the reservoir. The geologic model is here a vertical section comprising two 7.5 m-high and 100 m-thick layers (FIG. 1) C1, C2 with constant horizontal permeabilities K1, K2 of 200 mD and 100 mD respectively. The simulation grid is made up of ten cells for each layer in the horizontal direction, and the overall length is 500 m.

Water is injected, on the left side of the reservoir, into the lower layer and a total liquid flow rate (water+oil) is produced on the right side of the upper layer. The same volume flow rate (200 m³/d or 1250 bbl/d) is imposed on the injector and on the producing well so as to maintain the mean pressure and to prevent the oil pressure from falling below the bubble point.

The initial fluids that are present in the reservoir form a petroliferous reservoir containing 12% of irreducible water. A numerical simulation is conducted during a production period of 600 days. During a first period (from t=0 to t=300 days), only the oil phase is produced. The water reaches the producing well only after about 300 days. The volume of water produced increases during the last period: 10% of water at t=380 days and 77.7% of water at the end of the simulation (t=600 days).

Synthetic measurements are produced by using the results of this reference simulation. Only the first production period is used (from t=0 to t=300 days): it is assumed that the time when a water inflow occurs is unknown so as to keep a large proportion of uncertainty relative to the initial characterization of the reservoir. The measurement selected is the bottomhole pressure in the producing well, with five values observed between 25 and 300 days.

An overall uncertainty range is selected in order to describe both the measuring uncertainties and the numerical simulation errors. These uncertainties are modelled by means of Gaussian probability density functions centered on the results of the reference simulation and with $\sigma m=138$ kPa (20 psi) for the standard deviations.

These standard deviations are implemented in the objective function in the diagonal terms of the covariance operator $C_m$ relative to the measurements. If one considers the first term of the objective function Fm that quantifies the difference between the observations dm (in the present case, the bottomhole pressure) and the simulation response g(x,t), the diagonal terms of $C_m^{-1}$ are equal to $1/\sigma_m^2$.

Definition of the A Prior Geologic Model

It is assumed that the reference geologic model is unknown and that a priori geologic information is available. It is considered, on a hypothetical basis, that the geometry is well-characterized, that the horizontal permeabilities assigned to each layer are unknown and that a priori information is available on these permeabilities with a given margin of uncertainty.

Figure 2:
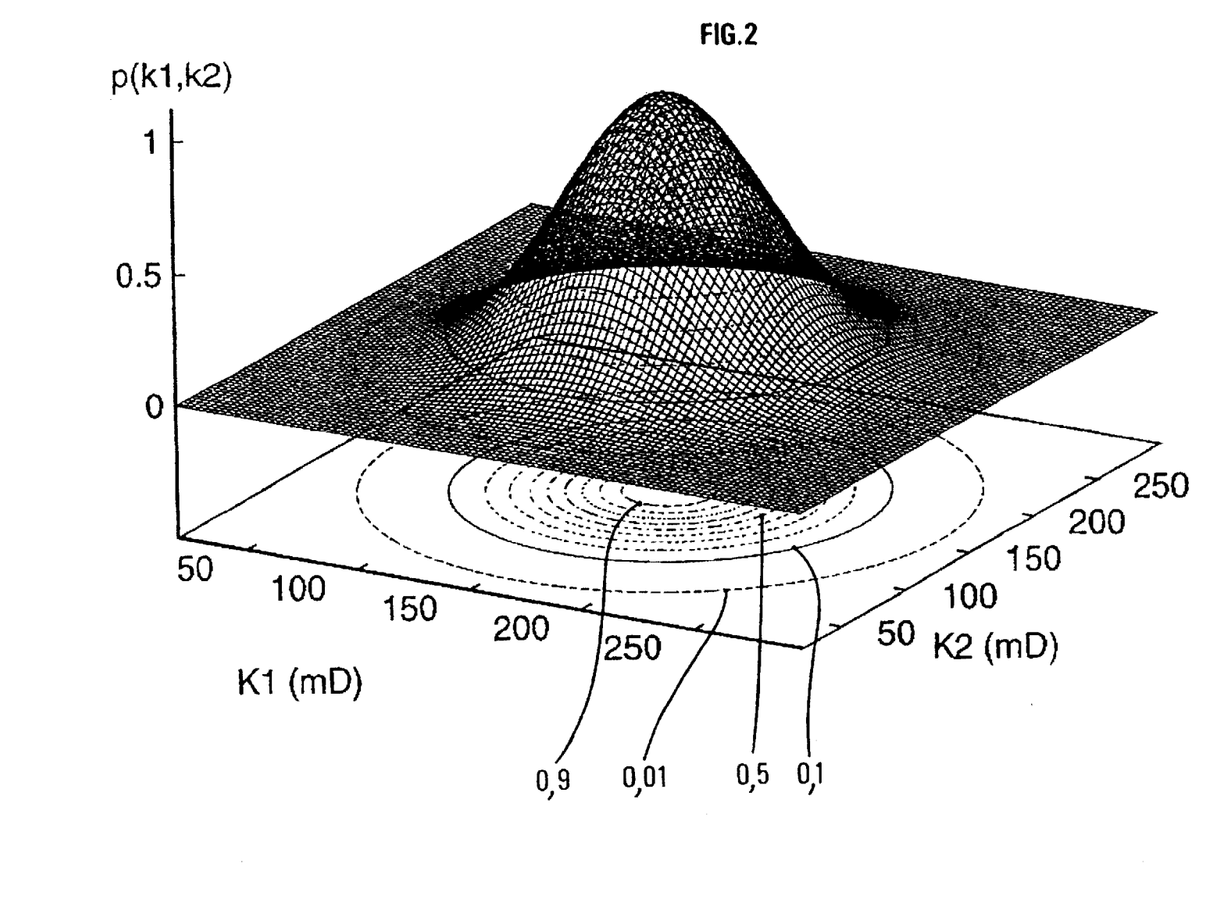
FIG. 2 shows the a priori probability density function (a priori pdf) p(k1,k2) characterizing the initial geologic model, as a function of the permeabilities K1, K2 of the layers C1, C2 of the model of FIG. 1.

The two horizontal permeabilities have been selected as the parameters to be inverted. The a priori available information is modelled by means of Gaussian uncertainties (FIG. 2). The difference between the a priori permeabilities $x_a$ and the parameters x is quantified in the second term of the objective function $F_x$.

The standard deviations of the parameters ax are introduced in the covariance operator $C_x$ in the same way as for the modelling of measuring errors: the diagonal terms of $C_x^{-1}$ are equal to $1/\sigma x^2$. The extra-diagonal terms are zero for this example, which means that the a priori information relative to a possible correlation between the two parameters has not been introduced.

The numerical values selected a priori are shown in Table 1 hereafter:

TABLE 1

| A priori geologic model | | | |
|---|---|---|---|
| | A priori value $x_a$ | Standard deviation x | Value of the reference case |
| K1 (upper layer) | 160 mD | 40 mD | 200 mD |
| K2 (lower layer) | 160 mD | 40 mD | 100 mD |

Comparison of Various Inversion Methods for the Test Case

A) Automatic history matching method

A conventional history matching method combined with an automatic optimization algorithm is applied in the first place. The a priori available geologic information is used, in this first approach, only to select the starting point of the procedure. The objective function to be minimized only includes the first term $F_m$ and does not take account of the a priori model.

The initial parameters are fixed at 160 mD (a priori values). The automatic matching procedure based on a gradient method and the conventional Gauss-Newton optimization algorithm are used. In this case, the gradient method allows to obtain the sensitivity of the bottomhole pressure in the producing well to the permeability values.

The model adapted thereby is very close to the reference case owing to the use of synthetic measurements produced by the numerical simulator. Only five simulations are necessary to obtain the position of the functional mimum. The optimization procedure is summed up in Table 2 hereunder from the starting point to an optimum:

TABLE 2

Automatic optimization procedure for history matching

| Iteration number | K1 | K2 | Fm |
|---|---|---|---|
| 0 | 160 mD | 160 mD | 0.799 |
| 1 | 172.8 mD | 133.6 mD | 0.407 |
| 2 | 193.4 mD | 104.9 mD | 0.042 |
| 3 | 200.8 mD | 99.1 mD | 0.0008 |
| 4 | 200.5 mD | 99.9 mD | 0.0003 |

Use of the Bayesian Type Inversion formalism

Figure 3:
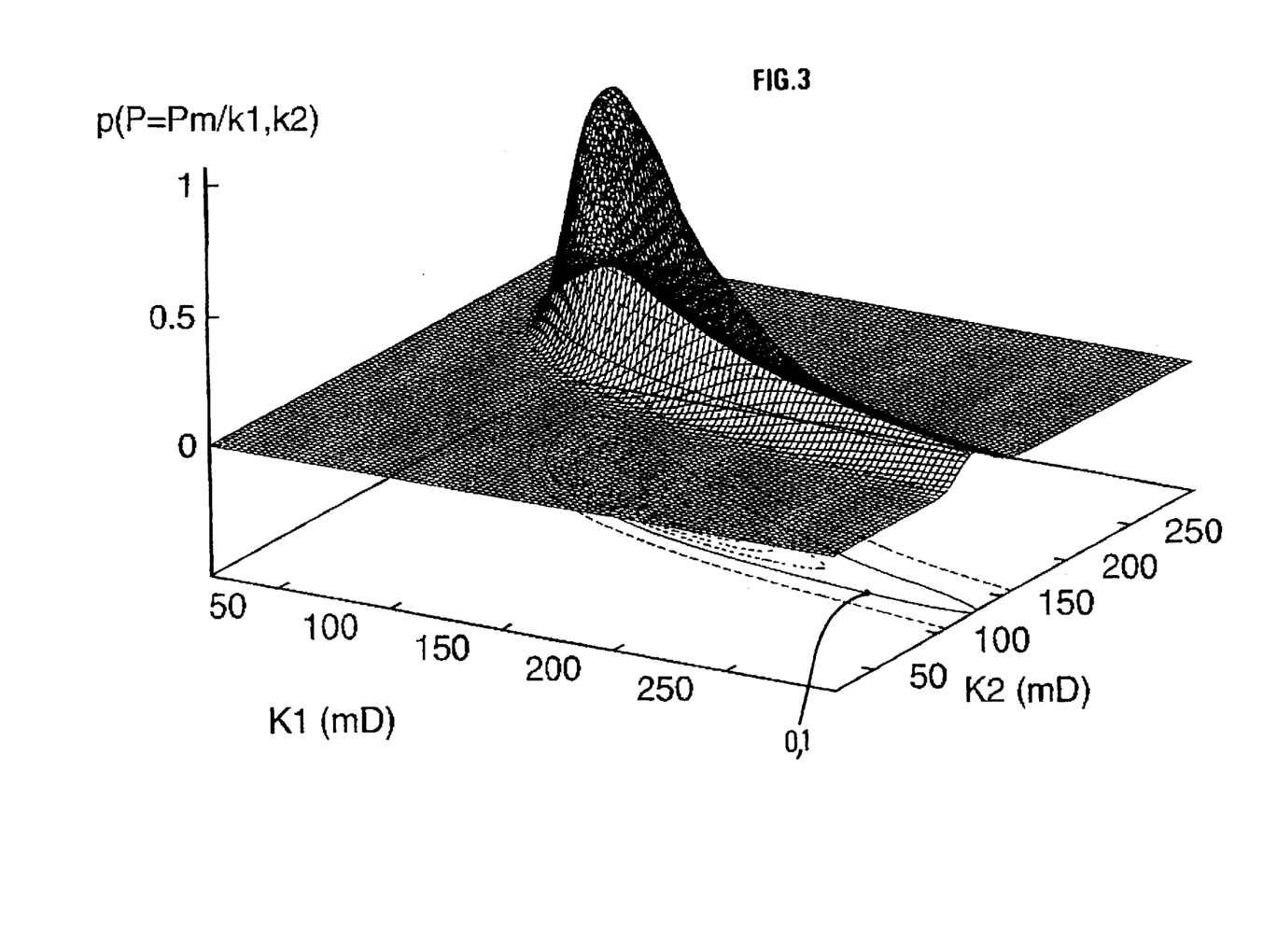
FIG. 3 shows how the resemblance or likelihood function p(P=Pm/K1,K2) characterizing the probability of a simulation varies as a function of these parameters.

The Bayesian inversion method allows to obtain the a posteriori probability density function mapped on the entire parameter space. In this case, the a priori available information (FIG. 2) is taken into account in this a posteriori probability density function, by combining it with the likelihood function (FIG. 3) calculated for each group of parameters.

Figure 4:
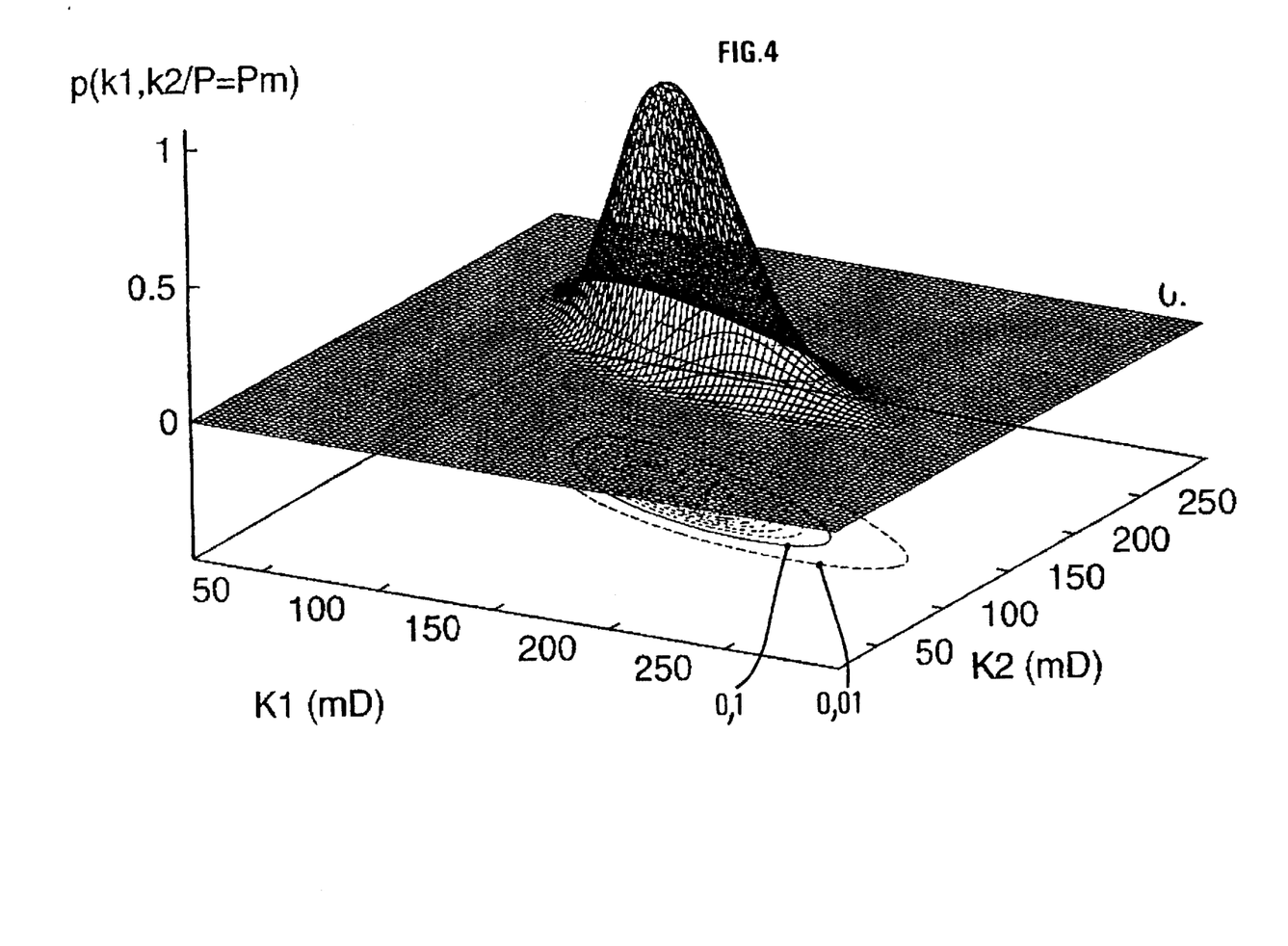
FIG. 4 shows the variation of the a posteriori probability density function (a posteriori pdf) p(k1,k2/P-Pm) obtained by Bayesian type inversion.

The parameter space has been mapped with a wide range of permeabilities, from 20 mD to 300 mD, with 35 values for each parameter (the total number of numerical simulations is $35^2=1225$ operations). It is advantageous to have a complete map of the a posteriori likelihood function since it allows considerable information on the simulation behaviour to be obtained. Considering the graphical representation of the function (FIG. 4), the following points can be noted:

only one optimum is clearly identified, at 143 mD (permeability of the upper layer) and at 173 mD (permeability of the lower layer). The maximum value of the a posteriori probability density function is $1.48 \cdot 10^{-7}$;

a better characterization of the geologic model has been obtained with a lesser uncertainty concerning the parameters (in comparison with the a priori probability density function pdf, FIG. 2);

a correlation is established between the two parameters: the shape of the surface is not symmetrical about the optimum, but distorted on a correlation axis.

Furthermore, integration of the surface allows to calculate a posteriori statistical parameters concerning the parameters.

Tables 4 and 5 hereafter show the a posteriori standard deviations compared to the initial data:

TABLE 4

Initial and a posteriori parameters

|  | Initial | A posteriori |
|---|---|---|
| K1 | 160 mD | 143 mD |
| K2 | 160 mD | 173 mD |

TABLE 5

Initial and a posteriori standard deviations

|  | Initial | A posteriori |
|---|---|---|
| K1 | 40 mD | 32.8 mD |
| K2 | 40 mD | 19.0 mD |

Use of the Bayesian Type Formalism Combined with the Gradients Method

This modified inversion procedure combining, as stated above, the Bayesian type inversion formalism with a gradients method has been applied to the experimental case.

Figure 5:
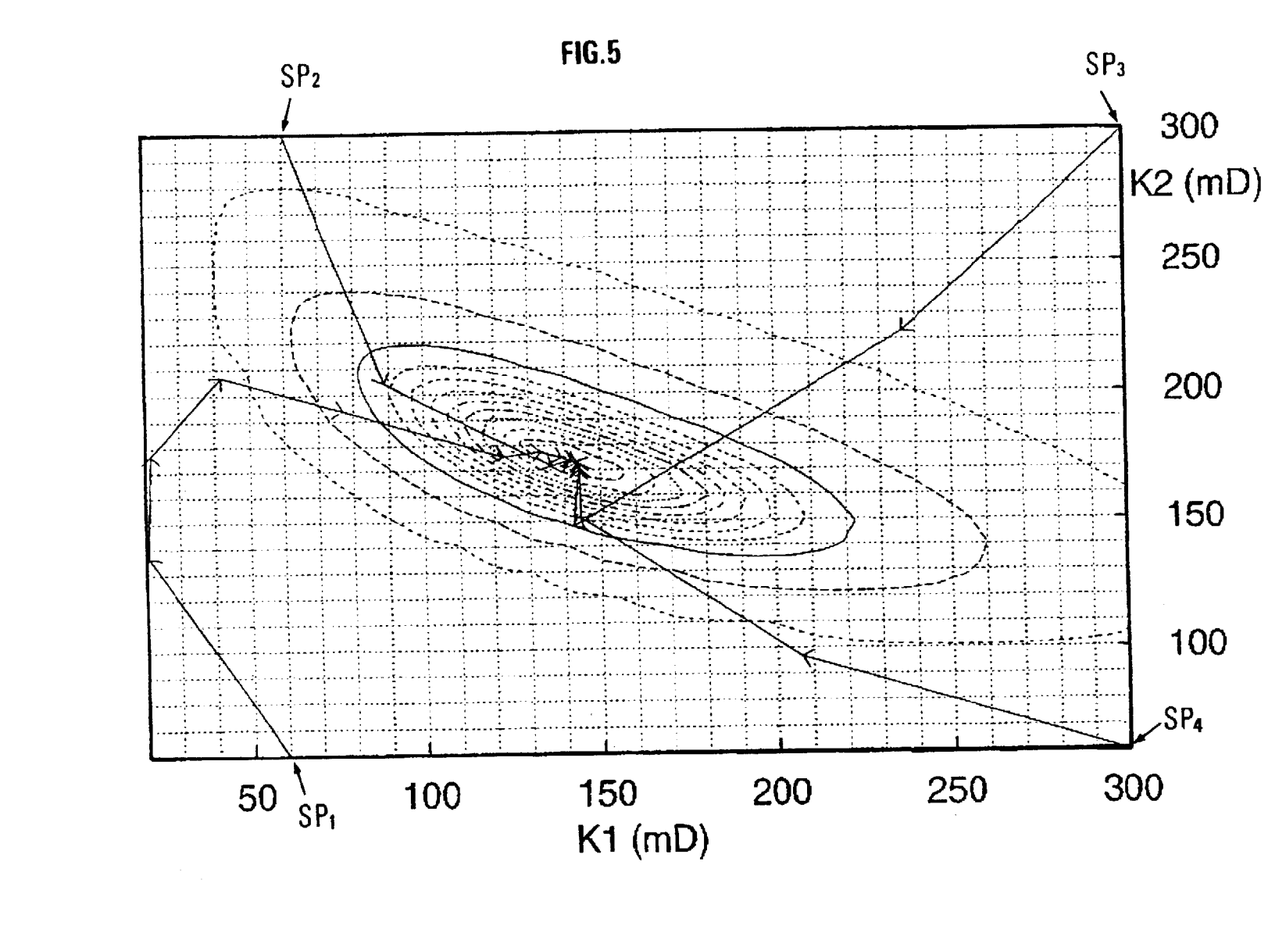
FIG. 5 shows the automatic adjustment process based on the combination of the Bayesian type formalism and of the gradients method, allowing to obtain the optimum a posteriori probability density function. The process is illustrated by starting from four different starting points SP1, SP2, SP3, SP4.
Figure 6:
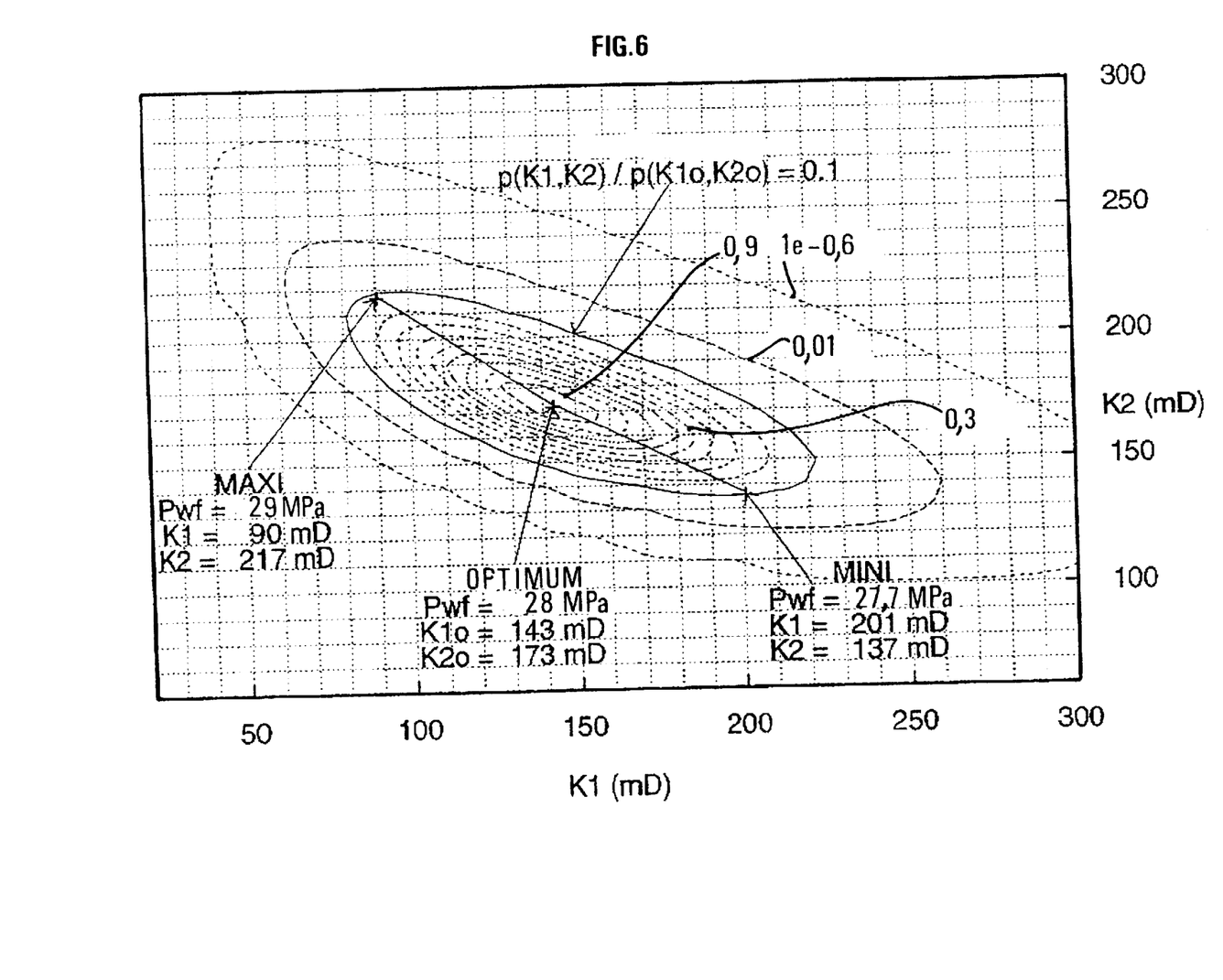
FIG. 6 shows, in the parameter space, the geologic models obtained for an optimum forecast, a maximum forecast and a minimum forecast.

The optimization algorithm is implemented to seek directly the optimum of the a posteriori probability density function pdf Four different starting points have been used to cover the initial uncertainty range. For each optimization procedure, the optimum is reached with a number of iterations ranging between 4 and 7 (FIG. 5). The statistical analysis proposed is applied in the neighbourhood of the optimum. The results obtained are compared with the conventional Bayesian inversion method in Table 6 hereafter:

TABLE 6

Comparative results obtained with the conventional Bayesian inversion and with the modified inversion

|  | Bayesian inversion | Modified inversion |
|---|---|---|
| Number of operations | 1225 | 20 |
| Optimum (in mD) | K1 = 143 | K1 = 143.2 |
|  | K2 = 173 | K2 = 172.9 |
| Standard deviations (in mD) | K1 = 32.8 | K1 = 31.4 |
|  | K2 = 19.0 | K2 = 18.8 |
| Max. of the a posteriori probability density function pdf | $1.48 \cdot 10^{-7}$ | $1.57 \cdot 10^{-7}$ |

This table clearly shows the execution rate allowed by the modified inversion method according to the invention.

Use of the Scenario Method

The results obtained for the experimental case are shown in Table 6. After using the automatic procedure described above in order to seek the optimum of the a posteriori probability density function, and therefore to obtain matching with the real data (from t=0 to t=300 days), by taking account of the a priori model, a direct numerical simulation has been used up to $t_f=600$ days. This simulation gives a mean forecast of the bottomhole pressure. The a posteriori probability rate ppr is selected thereafter, i.e. ppr =0.1. The extreme production scenarios are identified, the geologic model remaining within this probability range, by using the method according to the invention.

Figure 7:
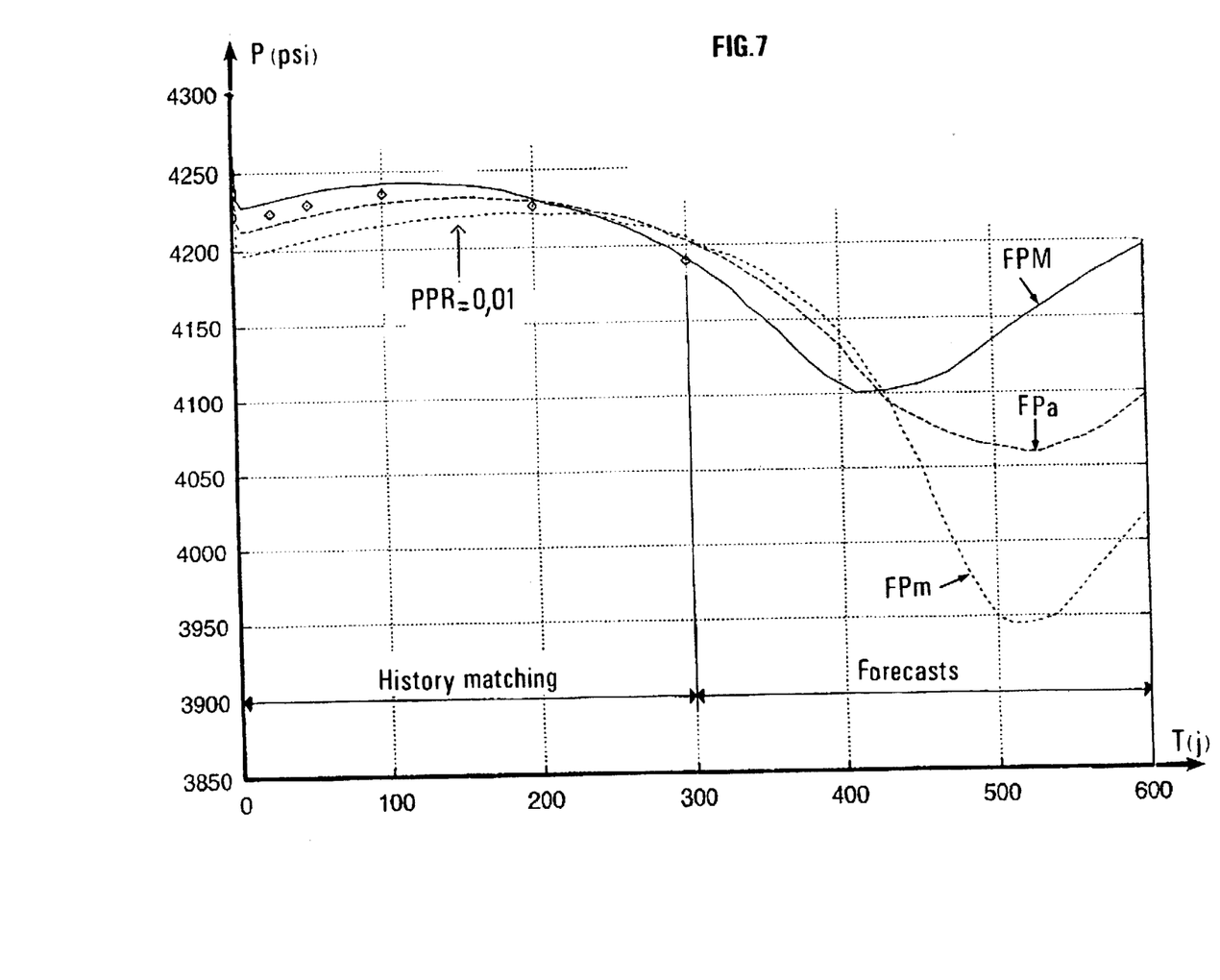
FIG. 7 shows the curve FPa representative of the forecasts relative to the variation with time of the pressure at the bottom of the producing well, surrounded by curves FPM and FPm corresponding respectively to the maximum and minimum forecasts.

The isoprobability constraints are shown in FIG. 7 (by using the Bayesian type inversion mapping) in order to superpose the values corresponding to the three scenarios (optimum, maxi. and mini.) in the parameter space. The location of the parameters corresponding to the mini/maxi scenarios is close to the border defined by the probability rate ppr=0.1. The numerical results are shown in Table 7.

TABLE 7

Extreme scenarios and comparison with the optimum

|  | Maxi. | Optimum | Mini. |
|---|---|---|---|
| Pressure (psi) | 4179 | 4098 | 4020 |
| K1 (mD) | 90.2 | 143.2 | 200.8 |
| K2 (mD) | 217.4 | 173.0 | 136.5 |

The uncertainty concerning the forecast relative to the bottomhole pressure at $t_f=600$ days is given by the difference between the maximum forecast and the minimum forecast. This shows that the uncertainties relative to the geologic model can be transposed into uncertainties relative to production forecasts.

We claim:

1. A method for predicting the evolution of the production of an underground zone containing fluids, such as a hydrocarbon reservoir, comprising the following stages:

a) an initial geologic model defined by a set of parameters x is constructed by integrating available data and an inversion method is applied to determine the values of parameters allowing the response of the model to be adjusted with a production history known for said zone, b) one or several possible scenarios of the production evolution are defined and, for each of these scenarios, observed data are added to fictitious data at given future times corresponding to hypotheses, c) for each of said scenarios, the parameters of said model are adjusted in order to reproduce both real measurements from the production history and data added at future times, and an inversion procedure is applied in order to obtain, for each scenario, a new set of parameters x characterizing a modified geologic model and corresponding to the scenario hypotheses, and d) for each of these modified geologic models, simulations are achieved in order to establish new production forecasts.

2. A method as claimed in claim 1, wherein scenarios corresponding to extreme forecasts are determined so as to quantify uncertainties on forecasts resulting from a simulation.

3. A method as claimed in claim 1, wherein scenario matching is adjusted in an optimization procedure through a combination of a Bayesian type formalism and a gradient method.

4. A method as claimed in claim 3, wherein a gradients method is used to obtain an approximation to the a posteriori probability density function.

* * * * *